United States Patent
Korjani

(10) Patent No.: US 10,614,827 B1
(45) Date of Patent: Apr. 7, 2020

(54) SYSTEM AND METHOD FOR SPEECH ENHANCEMENT USING DYNAMIC NOISE PROFILE ESTIMATION

(71) Applicant: Mohammad Mehdi Korjani, South Pasadena, CA (US)

(72) Inventor: Mohammad Mehdi Korjani, South Pasadena, CA (US)

(73) Assignee: OBEN, INC.

( * ) Notice: Subject to any disclaimer, the term of this patent is extended or adjusted under 35 U.S.C. 154(b) by 0 days.

(21) Appl. No.: 15/901,176

(22) Filed: Feb. 21, 2018

Related U.S. Application Data

(60) Provisional application No. 62/461,725, filed on Feb. 21, 2017.

(51) Int. Cl.
| | | |
|---|---|---|
| *G10L 15/20* | (2006.01) | |
| *G10L 21/0232* | (2013.01) | |
| *G10L 15/22* | (2006.01) | |
| *G10L 25/30* | (2013.01) | |
| *G10L 21/02* | (2013.01) | |
| *G10L 25/84* | (2013.01) | |
| *G10L 15/06* | (2013.01) | |
| *G10L 15/02* | (2006.01) | |

(52) U.S. Cl.
CPC .......... *G10L 21/0232* (2013.01); *G10L 15/02* (2013.01); *G10L 15/063* (2013.01); *G10L 15/22* (2013.01); *G10L 21/0205* (2013.01); *G10L 25/30* (2013.01); *G10L 25/84* (2013.01)

(58) Field of Classification Search
CPC ...................................................... G06N 20/00
See application file for complete search history.

(56) References Cited

U.S. PATENT DOCUMENTS

| | | | | |
|---|---|---|---|---|
| 5,732,392 A | * | 3/1998 | Mizuno ................ | G10L 25/78 704/222 |
| 2005/0248354 A1 | * | 11/2005 | Petchenev ......... | G01R 19/0053 324/613 |
| 2007/0083365 A1 | * | 4/2007 | Shmunk ............. | G10L 21/0272 704/232 |

(Continued)

*Primary Examiner* — Abul K Azad
(74) *Attorney, Agent, or Firm* — Andrew S. Naglestad

(57) ABSTRACT

A speech-enhancing noise filter is disclosed. The noise filter comprises a microphone for acquiring speech data from a user; a feature extraction module configured to extract a plurality of features characterizing the speech data; a neural network configured to receive the plurality of extracted features and to estimate a noise profile from the plurality of extracted features; a noise removal module configured to remove the noise profile from the noisy speech data; and a reconstruction module configured to generate a waveform from the plurality of frames after removal of the noise profile from each of those frames. The neural network is trained to isolate various types of noise from the user speech in the speech data and then subtract the noise from the speech data, thus leaving only the user speech free of noise. This filtering is dynamically performed on a frame-by-frame basis from each frame of the speech data, thereby making it possible to specifically identify and remove different types and levels of noise in each frame. The noise filter of the present invention accurately removes noise independent of the language in which the user utters the speech data.

13 Claims, 3 Drawing Sheets

(56) References Cited

U.S. PATENT DOCUMENTS

| | | | |
|---|---|---|---|
| 2007/0253561 A1* | 11/2007 | Williams | H04S 7/301 |
| | | | 381/58 |
| 2011/0191101 A1* | 8/2011 | Uhle | G10L 21/0208 |
| | | | 704/205 |
| 2017/0092268 A1* | 3/2017 | Kristjansson | G10L 15/20 |
| 2018/0137877 A1* | 5/2018 | Du | H04R 3/00 |

* cited by examiner

SYSTEM AND METHOD FOR SPEECH ENHANCEMENT USING DYNAMIC NOISE PROFILE ESTIMATION

CROSS-REFERENCE TO RELATED APPLICATION(S)

This application claims the benefit of U.S. Provisional Patent Application Ser. No. 62/461,725 filed Feb. 21, 2017, titled "Deep learning speech enhancement model using dynamic noise profile estimation," which is hereby incorporated by reference herein for all purposes.

TECHNICAL FIELD

The invention generally relates to the field of speech enhancement. In particular, the invention relates to a technique for estimating noise in speech data and using that estimated noise to filter the speech data.

BACKGROUND

There are many methods in the prior art for filtering noise from speech data. One of the more recent approaches is to use a neural network to model a speaker's voice and then identify the speech from the noisy speech data. This approach has met with limited success for several reasons. First, it requires a large amount of training time and training data including the speaker's speech, which is sometimes impractical or impossible to acquire. Second, the speech, after being extracted from the noise, may include some distortion depending on the precision with which the speech was modeled by the DNN. Third, the neural network model is likely to work with only a single language, meaning that an additional neural network must be trained and deployed for modeling speech of other languages. There is therefore a need for a robust technique to accurately represent and filter noise from speech data that operates independent of the amount of training speech data or language.

SUMMARY

The preferred embodiment of the present invention features a speech-enhancing noise filter comprising: a microphone for acquiring speech data from a user; a feature extraction module configured to extract a plurality of features characterizing the speech data; a neural network configured to receive the plurality of extracted features and to estimate a noise profile from the plurality of extracted features; a noise removal module configured to remove the noise profile from the speech data; and a reconstruction module configured to generate a waveform from the plurality of frames after removal of the noise profile from each of those frames.

The neural network is trained to isolate various types of noise from the user speech in the speech data. The noise may include, for example, car sounds, street sounds, office sounds, clicking sounds, popping sounds, and crackling sounds. Once isolated, the noise is then subtracted or otherwise removed from the speech data, thus leaving only the user speech free of noise. This filtering is dynamically performed on a frame-by-frame basis from each frame of the speech data, thereby making it possible to specifically identify and remove different types and levels of noise in each frame. The neural network is trained only to isolate noise, and the noise profile that is estimated for each frame consists of the noise estimate alone. Since the neural network is not trained to estimate speech in the speech data, the noise filter of the present invention accurately removes noise independent of the language in which the user utters the speech data.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

The Speech enhancing noise (SEN) filter of the present invention is configured to remove noise from noisy speech using a deep neural network (DNN), for example, that models the noise in the noisy speech rather than the speech itself. In particular, the DNN is trained to recognize and isolate the noise in any speech data so that the noise may be dynamically removed in a later stage of processing. Since the DNN models the noise rather than the speech, the SEN filter operates independent of the language of the speech and independent of the amount of speech training data. The accuracy of the model of the noise is based primarily on the degree to which the DNN is trained on noise rather than the speech, thereby allowing the filter to reproduce the speech with little speech training data.

Figure 1:
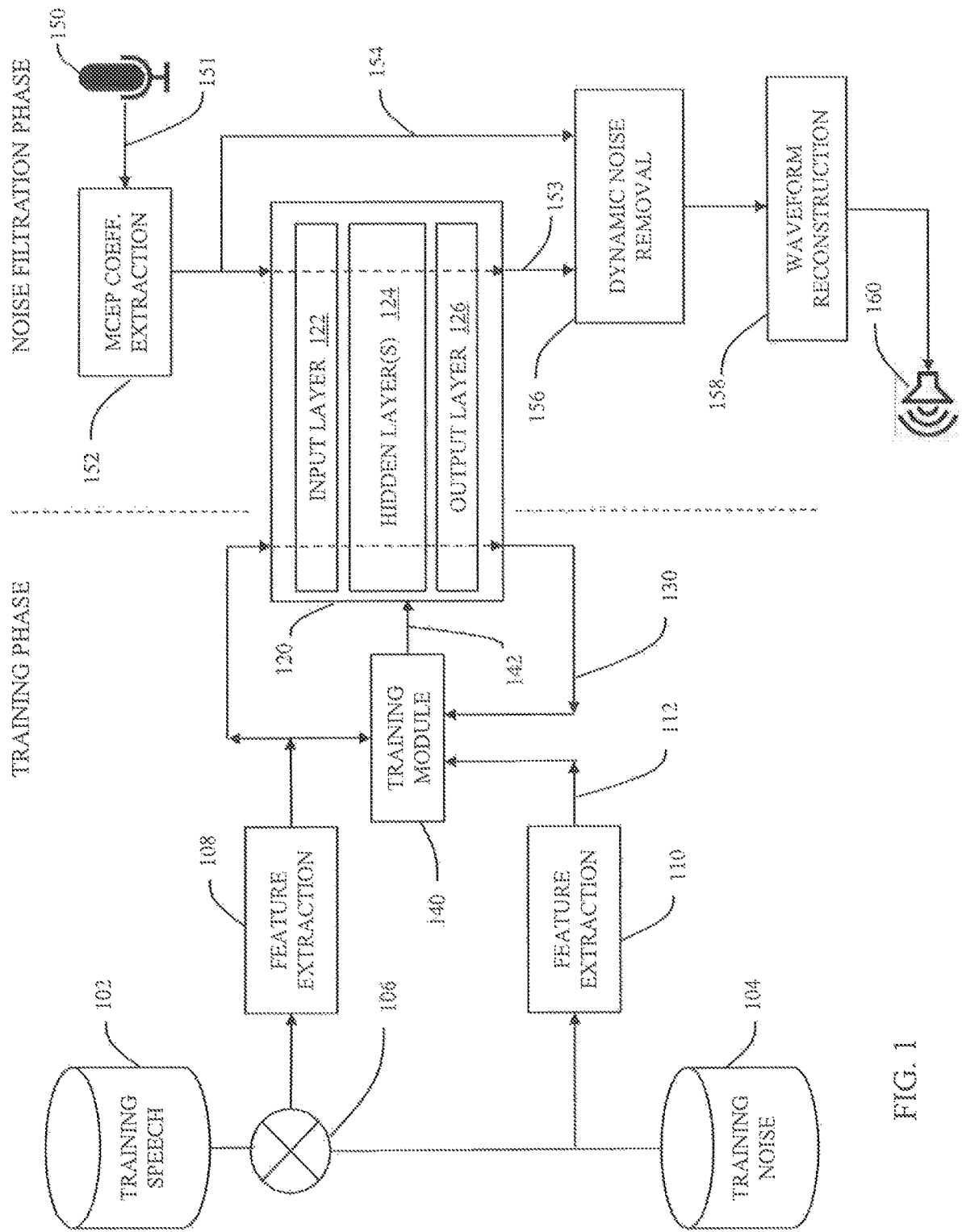
FIG. 1 is a functional block diagram of the speech-enhancing noise filter, in accordance with one of embodiment of the present invention.

A preferred embodiment of the SEN filter is illustrated in the functional block diagram of FIG. 1. A shown, the SEN filter is based on a DNN 120 trained to model and recognize noise in speech data. The DNN is first trained to recognize noise data in a first stage shown at the left and then utilized to isolate noise in speech data in a second stage shown at the right. To train the DNN 120, clean speech is combined with known samples of noise and the combination used to refine the thresholds of nodes in and link weights between the input layer 122, hidden layer(s) 124, and output layer 126 of the DNN. In particular, the training speech in database 102 and noise data in database 104 are combined by a mixer 106 and the acoustic features extracted 108 before being provided as input into the DNN 120. In the preferred embodiment, the features extracted from the combined audio are spectral features, although various other forms of features in different domains may also be used to represent the combination audio including the time domain, frequency domain, or Cepstral domain.

Based on the spectral coefficients provided as input, the DNN 120 generates an estimate of the noise 130 present in the input audio. The estimate of the noise profile 130 is represented in terms of spectral coefficients in the preferred embodiment. In parallel, the feature extractor 110 provides the spectral coefficients of the training noise 112 to a DNN training module 140. The training module 140 compares the training noise 112 with the estimate of the noise 130, estimates an error between the two profiles 112, 130, and then generates or otherwise modifies one or more link weights and/or thresholds 142 in the DNN 120 in order to minimize the error between the training noise and noise estimate. The process of training the DNN 120 is repeated on multiple samples/frames of noise 104 and speech 102 until the error observed is below a predetermined threshold. Preferably, the noise samples on which the DNN are trained are representative of the same environmental noise conditions under which the filtering process is to operate. These types of noise may include, for example, car noise, street noise, office noise, background, etc.

In the operational phase, the DNN estimates noise in recordings of user speech for subsequent removal. As shown on the right hand side in FIG. 1, noisy speech data 151 is recorded using a microphone 150 in a user's mobile phone, for example. The recording of the noisy speech is provided as input to the feature extractor 152 which extracts spectral coefficients in the preferred embodiment. The extracted features are provided as input to the DNN 120 which then estimates the component of noise 153 in the speech data separate and apart from the user utterances/speech in the recording.

The noise estimate 153 from the DNN is represented in the form of spectral coefficients in the preferred embodiment. A noise profile 153 is estimated for each frame of the recording, each frame generally being a segment of audio data corresponding to a five to thirty millisecond portion of the audio recording 151. The dynamic noise removal module 156 then (a) receives the noise estimate 153 and segment/representation of noisy speech 154, and (b) removes the noise 153 from the noisy speech 154 on a frame-by-frame basis. In the preferred embodiment, noise is removed dynamically using statistic measures of noise rather than estimates of the speech.

In accordance with the preferred embodiment, the present SEN filter can identify and remove noise over the course of an utterance even if that noise changes during the utterance. Thus, the present invention changes dynamically in response to noise, in contrast to prior art techniques in which noise is assumed to be constant for the duration of the utterance. As such, the noise filter is able to remove sudden and short duration noises including clicking, popping, and crackling sounds.

The frames of user speech, after removal of the noise, are concatenated and converted by the waveform reconstruction module 158 as needed into an audio file or audio stream that may then be played back to the user via a speaker 160 on the user phone, for example. The clean speech contains less noise comparatively to the original speech and to the speech of other filters found in the prior art.

Figure 2:
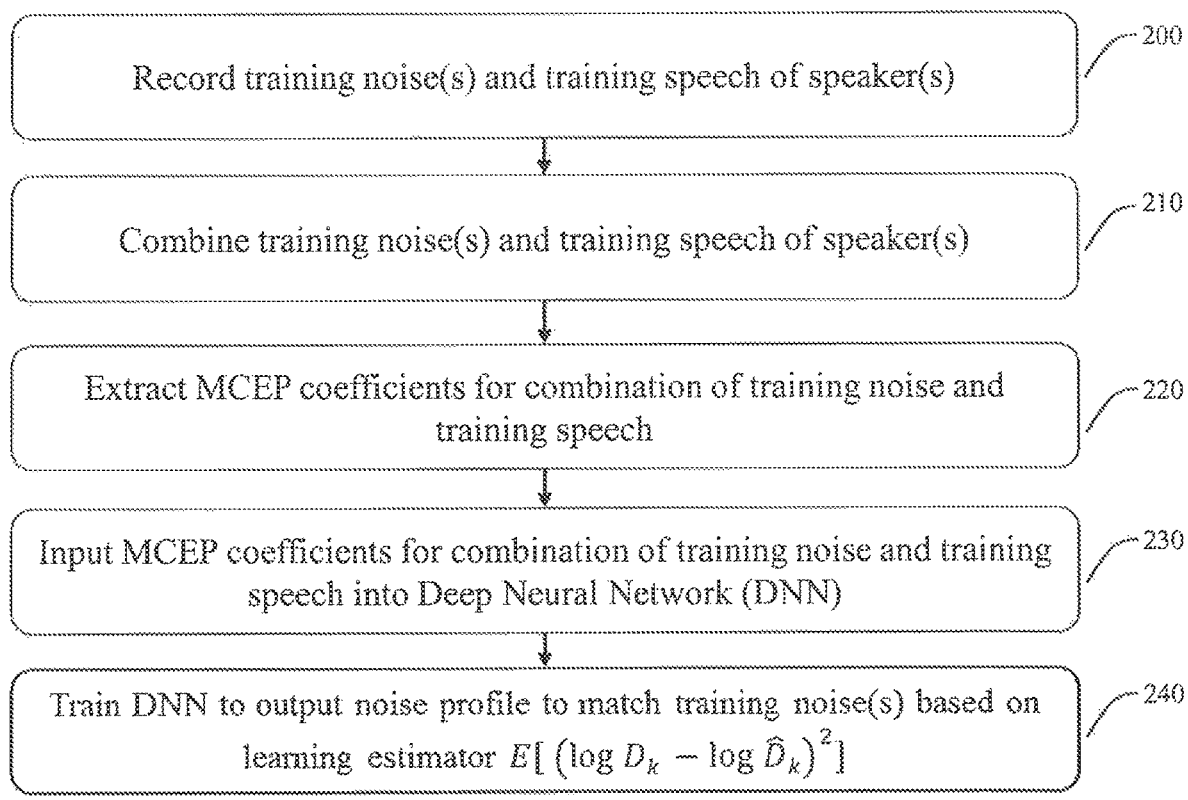
FIG. 2 is a flowchart of the method of training a deep neural network employed in the speech-enhancing noise filter, in accordance with one of embodiment of the present invention.

Illustrated in FIG. 2 is a flowchart of the method of training the DNN, in accordance with the preferred embodiment of the present invention. Training begins with the recording 200 of training speech in database 102 and training noise in database 104. The training speech may include utterances from multiple speakers representing different genders, ages, accents, etc. Similarly, the training noise may include sounds from a wide variety of noisy environments, preferably all the environments that will contribute noise to the noisy speech to be acquired from the user during noise filtering operations.

The training speech and training data are then combined 210 by means of mixer to produce noisy speech training data. Audio features, preferably spectral features, are then extracted 220 from the noisy speech training data. These spectral features from the combination of training noise and training speech are provided 230 as input into Deep Neural Network (DNN).

The link weights and thresholds of the DNN are then adjusted and optimized 240 to output a noise profile that best matches the training noise when provided in the noisy speech training data. When properly trained, the noise filter estimates the noise n(i) and recovers clean speech s(i) from the noisy speech x(i) where:

$$x(i)=s(i)+n(i) \quad [1]$$

Taking the short-time Fourier Transform (STFT), the time-frequency domain representation of on equation [1] is given by:

$$N_k(l)=S_k(l)+N_k(l) \quad [2]$$

where k is the frequency index, l is the segment index, and $N_k$, $S_k$, and $N_k$ are the spectra of the clean speech, noise, and noisy speech, respectively. The spectral coefficients can be written in terms of their amplitude and phase, denoted:

$$Y=Re^{i\psi_Y}; \; S=Ae^{i\phi_S}; \; N=De^{i\phi_N} \quad [3]$$

According to the formulation of the estimation problem in [3], the appropriate learning estimator is given by Dk where Dk minimizes the following criterion:

$$E[(\log D_k - \log \hat{D}_k)^2] \quad [4]$$

Figure 3:
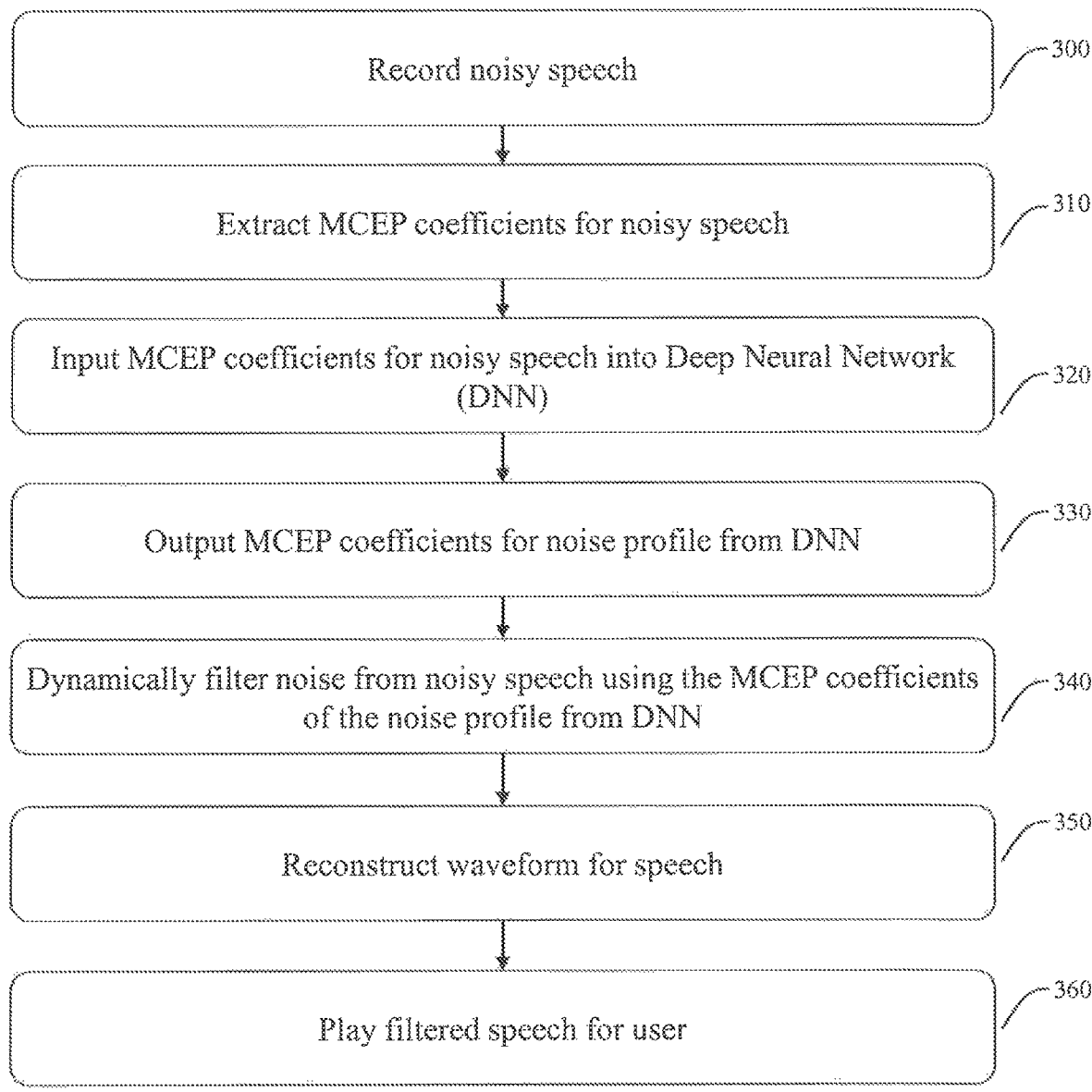
FIG. 3 is a flowchart of the method of using the speech-enhancing noise filter, in accordance with one of embodiment of the present invention.

Illustrated in FIG. 3 is a flowchart of the method of filtering noise from noisy speech data, in accordance with the preferred embodiment of the present invention. The noisy speech from the user is recorded 300 using a microphone or mobile phone, for example. The audio features, preferably MCEP coefficients, are extracted 310 from each frame of the noisy speech data. The MCEP coefficients of each frame are provided 320 as input into the DNN, which outputs 330 MCEP coefficients representing a spectral profile of the noise (and only the noise) present in the frame of noisy speech. The noise profile is then subtracted or otherwise removed 340 from the spectral envelope for the noisy speech.

The estimation of the noise profile and removal of noise is done on a frame-by-frame basis for the entire noisy speech signal. Once noise is isolated and removed from all the frames, the frames of clean speech are assembled or otherwise reconstructed 350 into a complete waveform. This waveform includes the speech content of the original noisy speech but without the noise. This waveform with filtered speech may then be transmitted to a user and played 360 using a mobile phone, for example.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A speech-enhancing noise filter comprising:
   a microphone for acquiring speech data from a user;
   a feature extraction module configured, for each of a plurality of frames, to receive speech data and to extract a plurality of features characterizing the speech data;
   a neural network comprising an input layer, one or more hidden layers, and an output layer; wherein the neural network is configured, for each of a plurality of frames, to receive the plurality of extracted features and to estimate a noise profile from the plurality of extracted features; wherein the neural network is trained only to isolate noise, and the estimated noise profile for each of the plurality of frames consists of noise alone;
   a noise removal module configured, for each of a plurality of frames, to remove the noise profile from the speech data;
   a reconstruction module configured to generate a waveform from the plurality of frames after removal of the noise profile from each of those frames; and
   training module configured to:
      a) receive noisy training data comprising training speech and training noise;
      b) extract audio features from the noisy training data;
      c) input, to the neural network, the extracted features for the noisy training data;
      d) receive, from the neural network, an estimate of a noise profile for the noisy training data; and
      e) alter the one or more hidden layers to minimize a difference between the training noise and the noise profile received in response to the noisy training data.

2. The speech-enhancing noise filter of claim 1, further comprising an audio speaker to play the waveform to the user.

3. The speech-enhancing noise filter of claim 2, wherein the training noise comprises environmental noise.

4. The speech-enhancing noise filter of claim 3, wherein the environmental noise comprises car sounds, street sounds, and office sounds.

5. The speech-enhancing noise filter of claim 3, wherein the environmental noise comprises clicking sounds, popping sounds, and crackling sounds.

6. The speech-enhancing noise filter of claim 3, wherein said speech data from the user comprises words, wherein those words are associated with two or more languages.

7. The speech-enhancing noise filter of claim 3, wherein the neural network is not configured to estimate noise-free speech.

8. The speech-enhancing noise filter of claim 7, wherein the neural network is configured to estimate the noise profile independent of a language of the speech data acquired from a user.

9. The speech-enhancing noise filter of claim 1, wherein in the noise removal module is configured to remove the noise profile from one of the plurality of frames the speech data at the same time the neural network estimates a noise profile for a different one of the plurality of frames, whereby noise reduction is dynamic.

10. A method of enhancing speech data with a noise filter, the method comprising:
   training a neural network to recognize noise, wherein the neural network comprises an input layer, one or more hidden layers, and an output layer, the training comprising:
      a) receiving noisy training data comprising training speech and training noise;
      b) extracting audio features from the noisy training data;
      c) inputting, to the neural network, the extracted features for the noisy training data;
      d) receive, from the neural network, an estimate of a noise profile for the noisy training data; and
      e) alter the one or more hidden layers to minimize a difference between the training noise and the noise profile received in response to the noisy training data;
   receiving speech data from a user via a microphone;
   generating a plurality of frames of speech data;
   for each of the plurality of frames of speech data, extracting a plurality of features characterizing the speech data;
   for each of the plurality of frames, estimating a noise profile based on the plurality of extracted features characterizing the speech data; wherein the estimated noise profile for each of the plurality of frames consists of noise alone;
   for each of the plurality of frames, removing the noise profile from the speech data; and
   generating a waveform from the plurality of frames after removal of the noise profile from each of those frames.

11. The method of claim 10, wherein each noise profile consists of an estimate of noise present in the speech data.

12. The method of claim 11, wherein each noise profile excludes any estimate of user speech.

13. The method of claim 12, wherein the step of estimating a noise profile comprises:
   estimating a noise profile using a neural network trained to estimate noise only.

* * * * *